US012579498B2

(12) United States Patent
Karri et al.

(10) Patent No.: US 12,579,498 B2
(45) Date of Patent: Mar. 17, 2026

(54) MAINTENANCE AWARE ROBOT-BASED DELIVERY SYSTEM

(71) Applicant: INTERNATIONAL BUSINESS MACHINES CORPORATION, Armonk, NY (US)

(72) Inventors: Venkata Vara Prasad Karri, Visakhapatnam (IN); Saraswathi Sailaja Perumalla, Visakhapatnam (IN); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 17/652,304

(22) Filed: Feb. 24, 2022

(65) Prior Publication Data

US 2023/0267402 A1 Aug. 24, 2023

(51) Int. Cl.
*G06Q 10/0832* (2023.01)
*B64U 10/13* (2023.01)
(Continued)

(52) U.S. Cl.
CPC ......... *G06Q 10/0832* (2013.01); *B64U 10/13* (2023.01); *G06Q 10/20* (2013.01);
(Continued)

(58) Field of Classification Search
CPC .... G06Q 10/0832; G06Q 10/20; B64U 10/13; G07C 5/006; G07C 5/0808; G64U 2201/10; G64U 2101/60
See application file for complete search history.

(56) References Cited

U.S. PATENT DOCUMENTS 9,373,149 B2 * 6/2016 Abhyanker ............ G06Q 10/10
9,412,280 B1 * 8/2016 Zwillinger ............... G08G 5/54
(Continued)

FOREIGN PATENT DOCUMENTS

CN 107879206 A * 4/2018 ........... B66B 1/3446
CN 111099462 A * 5/2020 ............... B66B 1/06
(Continued)

OTHER PUBLICATIONS

Assaf Keller, "A Robust and accurate landing methodology for drones on moving targets", published by MDPI on Apr. 15, 2022, (Year: 2022).*
(Continued)

*Primary Examiner* — Omar Zeroual
(74) *Attorney, Agent, or Firm* — Tihon Poltavets

(57) ABSTRACT
A method, a computer program product, and a computer system coordinate a robot-based delivery system. The method includes receiving performance information associated with a delivery robot indicative of operational parameters. The method includes determining maintenance tasks and a time required therefor prior to a delivery task assigned to the delivery robot based on the performance information. The method includes determining a location on a delivery arrangement based on the maintenance tasks and the time. The delivery arrangement includes a package conveyor on which the package is placed and moved therealong and a delivery robot conveyor on which the delivery robot is to be placed and moved therealong. The method includes transmitting an instruction to the delivery robot to land on the delivery robot conveyor at the location such that the one or more maintenance tasks being performed is synchronized with the delivery robot being prepared for the delivery task.

19 Claims, 7 Drawing Sheets

(51) Int. Cl.
 *B64U 101/60* (2023.01)
 *G06Q 10/20* (2023.01)
 *G07C 5/00* (2006.01)
 *G07C 5/08* (2006.01)

(52) U.S. Cl.
 CPC ........... *G07C 5/006* (2013.01); *G07C 5/0808* (2013.01); *B64U 2101/60* (2023.01); *B64U 2201/10* (2023.01)

(56) References Cited

U.S. PATENT DOCUMENTS

| | | | | |
|---|---|---|---|---|
| 9,764,836 | B1 * | 9/2017 | Elzinga | B64U 80/70 |
| 10,007,890 | B1 * | 6/2018 | Purwin | G08G 5/57 |
| 10,308,430 | B1 * | 6/2019 | Brady | G06Q 10/083 |
| 10,399,706 | B1 * | 9/2019 | Hanlon | G07C 5/0841 |
| 10,640,234 | B1 * | 5/2020 | Douglas | B64U 50/37 |
| 10,974,911 | B2 | 4/2021 | Zevenbergen | |
| 10,976,752 | B2 | 4/2021 | Venturelli | |
| 11,222,299 | B1 * | 1/2022 | Baalke | G01C 21/3691 |
| 11,263,579 | B1 * | 3/2022 | Siegel | G06Q 10/0832 |
| 11,276,030 | B2 * | 3/2022 | Clarke | G07F 17/12 |
| 11,479,360 | B2 * | 10/2022 | Costanzo | B64U 50/37 |
| 11,724,784 | B2 * | 8/2023 | Fiorello | B63G 8/08 |
| | | | | 119/213 |
| 11,724,878 | B2 * | 8/2023 | Hart | B65G 1/04 |
| | | | | 414/278 |
| 11,813,950 | B2 * | 11/2023 | O'Brien | H02J 7/0013 |
| 2012/0090923 | A1 * | 4/2012 | Smith | B66B 1/2458 |
| | | | | 187/382 |
| 2014/0032034 | A1 * | 1/2014 | Raptopoulos | G08G 5/55 |
| | | | | 701/25 |
| 2014/0149244 | A1 * | 5/2014 | Abhyanker | G06Q 30/0605 |
| | | | | 705/26.2 |
| 2015/0006005 | A1 * | 1/2015 | Yu | G05D 1/667 |
| | | | | 701/22 |
| 2016/0144734 | A1 * | 5/2016 | Wang | B64C 29/0016 |
| | | | | 701/17 |
| 2016/0257423 | A1 * | 9/2016 | Martin | A47G 29/14 |
| 2017/0004714 | A1 * | 1/2017 | Rhee | G08G 5/57 |
| 2017/0124512 | A1 * | 5/2017 | Harvey | G06Q 10/08355 |
| 2017/0274531 | A1 * | 9/2017 | Johnson | G06Q 10/087 |
| 2018/0321685 | A1 * | 11/2018 | Yalla | G07C 9/38 |
| 2018/0350245 | A1 * | 12/2018 | Priest | G08G 5/80 |
| 2019/0023418 | A1 * | 1/2019 | Ro | G06F 18/24 |
| 2019/0069019 | A1 * | 2/2019 | Hsu | B66B 3/008 |
| 2019/0072979 | A1 * | 3/2019 | Sukhomlinov | G07G 1/0081 |
| 2019/0146496 | A1 * | 5/2019 | Woodrow | G05D 1/0088 |
| | | | | 701/25 |
| 2019/0152326 | A1 * | 5/2019 | Nishikawa | B64U 50/19 |
| 2019/0193952 | A1 * | 6/2019 | Zevenbergen | B60L 53/12 |
| 2019/0196512 | A1 * | 6/2019 | Blake | G06Q 50/40 |
| 2019/0204844 | A1 * | 7/2019 | Lau | G05D 1/0274 |
| 2019/0227683 | A1 * | 7/2019 | Suvitie | G06Q 50/40 |
| 2019/0233105 | A1 * | 8/2019 | O'Brien | B64U 70/30 |
| 2019/0244167 | A1 * | 8/2019 | Kaneko | G06Q 10/0833 |
| 2019/0262992 | A1 * | 8/2019 | Kim | G05D 1/0234 |
| 2019/0383052 | A1 * | 12/2019 | Blake | B60L 53/30 |
| 2020/0055694 | A1 * | 2/2020 | Sokolov | B66B 9/00 |
| 2020/0061839 | A1 * | 2/2020 | Deyle | G06Q 10/087 |
| 2020/0086987 | A1 * | 3/2020 | Schmalzried | G06Q 10/047 |
| 2020/0089220 | A1 * | 3/2020 | Schmalzried | G07C 5/008 |
| 2020/0090121 | A1 * | 3/2020 | Gupta | G06Q 10/087 |
| 2021/0005038 | A1 * | 1/2021 | McCombs | G07C 9/00571 |
| 2021/0039917 | A1 * | 2/2021 | Zhang | B66B 13/26 |
| 2021/0114729 | A1 * | 4/2021 | Ragan | B64D 9/00 |
| 2021/0279678 | A1 * | 9/2021 | Ur | G06Q 10/08355 |
| 2021/0283439 | A1 * | 9/2021 | Raucher | G08G 5/74 |
| 2022/0083987 | A1 * | 3/2022 | Bhunia | G05D 1/101 |
| 2023/0090155 | A1 * | 3/2023 | Joao | B60L 1/02 |
| | | | | 701/22 |
| 2023/0090324 | A1 * | 3/2023 | Ran | G06F 8/61 |
| | | | | 717/171 |
| 2023/0159192 | A1 * | 5/2023 | Gil | B64U 80/40 |
| | | | | 244/137.1 |
| 2023/0195106 | A1 * | 6/2023 | Siegler | G06Q 10/047 |
| | | | | 701/2 |
| 2023/0268869 | A1 * | 8/2023 | Thramann | E04H 6/06 |
| | | | | 324/101 |

FOREIGN PATENT DOCUMENTS

| | | | | | |
|---|---|---|---|---|---|
| CN | 113246790 | A * | 8/2021 | | B64U 50/19 |
| WO | WO-2016137982 | A1 * | 9/2016 | | G08G 5/54 |
| WO | WO-2017027780 | A1 * | 2/2017 | | B65G 17/24 |
| WO | WO-2018005367 | A1 * | 1/2018 | | B65G 47/26 |
| WO | WO-2018199361 | A1 * | 11/2018 | | G06Q 50/10 |
| WO | WO-2019144080 | A1 * | 7/2019 | | B64C 37/00 |
| WO | WO-2019172927 | A1 * | 9/2019 | | H04W 4/40 |
| WO | WO-2021194852 | A1 * | 9/2021 | | G06Q 10/083 |
| WO | WO-2025051727 | A1 * | 3/2025 | | G06Q 10/087 |

OTHER PUBLICATIONS

Disclosed Anonymously, "Battery Drone Management System for Continous Driving" IPCOM000253312D, Mar. 21, 2018, pp. 1-6.
Disclosed Anonymously. "System for UAV Fleet Predictive Maintenance", IPCOM000255916D, Oct. 22, 2018, pp. 1-3.
https://www.youtube.com/watch?v=98Blu9dpwHU, "Amazon Prime Air", YouTube, Accessed Feb. 24, 2022, pp. 1-4.
Mell et al., "The NIST Definition of Cloud Computing", National Institute of Standards and Technology, Special Publication 800-145, Sep. 2011, pp. 1-7.

* cited by examiner

SYSTEM
100

WAREHOUSE

NETWORK

108

DELIVERY ARRANGEMENT

PACKAGE CONVEYOR

PACKAGE

125

120

DRONE CONVEYOR

DRONE

135

130

110

COORDINATION SERVER

COMMUNICATION
PROGRAM
142

COORDINATION
PROGRAM
144

140

105

PACKAGE CONEYOR
120

PACKAGE TRACK
200

DRONE CONVEYOR
130

DRONE TRACK
300

DELIVERY ARRANGEMENT
110

DRONE TRACK
300

135

135

135

135

135

La

135

Lb

135c

Dd

125

Dp

125

125

PACKAGE TRACK
200

METHOD
500

START

RECEIVE INFORMATION FROM DRONE
502

DETERMINE MAINTENANCE NEEDS OF DRONE
504

DETEMINE TIME REQUIRED FOR MAINTENANCE NEEDS
506

DETERMINE POSITION OF DRONE ON DRONE CONVEYOR
508

UPDATE POSITIONS OF FURTHER DRONES ON DRONE CONVEYOR?
510
NO

YES

TRANSMIT INSTRUCTIONS TO FURTHER DRONES
512

TRANSMIT INSTRUCTIONS TO DRONE
514

END

MAINTENANCE AWARE ROBOT-BASED DELIVERY SYSTEM

BACKGROUND

The exemplary embodiments relate generally to delivery systems, and more particularly to robot-based delivery systems that coordinate the use of drones in delivering packages by incorporating maintenance needs.

A delivery organization may utilize various means of delivering a package from a first location to a second location. With regard to delivery of the package from a warehouse or other storage location to a customer location, the delivery organization may rely on conventional means such as an entirely manual process involving one or more individuals who locate a product in the warehouse, create the package, load the package to a delivery vehicle, transport the package via the delivery vehicle, and complete the delivery of the package. The introduction of robots with automated movement and load carrying capabilities has allowed one or more of the above noted delivery steps to be performed by the robots. For example, the robots may be drones with ground (e.g., driving) and/or air (e.g., flight) movement capabilities. The drones being robots overcome a plurality of drawbacks of using manual labor such as human error, fatigue, etc. In this manner, the drones may increase a total uptime in which the delivery operations are being performed. However, the drones introduce other issues that need to be addressed. For example, the drones may use a portable power supply that needs to be recharged or replaced. In another example, the drones may require other forms of maintenance (e.g., replacement or fixing of broken parts). In this manner, the drones may decrease the total uptime.

SUMMARY

The exemplary embodiments disclose a method, a computer program product, and a computer system for coordinating a robot-based delivery system. The method comprises receiving performance information associated with a delivery robot of the robot-based delivery system. The performance information is indicative of operational parameters of the delivery robot. The method comprises determining one or more maintenance tasks to be performed on the delivery robot prior to a delivery task in collecting a package and delivering the package based on the performance information. The method comprises determining a time required to perform the one or more maintenance tasks. The method comprises determining a location on a delivery arrangement of the robot-based delivery system based on the one or more maintenance tasks and the time. The delivery arrangement includes a package conveyor on which the package is placed and moved therealong and a delivery robot conveyor on which the delivery robot is to be placed and moved therealong. The method comprises transmitting an instruction to the delivery robot to land on the delivery robot conveyor at the location such that the one or more maintenance tasks being performed is synchronized with the delivery robot being prepared for the delivery task.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
FIG. 1 depicts an exemplary schematic diagram of a robot-based delivery system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for coordinating a robot-based delivery system. The exemplary embodiments provide a mechanism that determines an optimization solution to coordinate a plurality of robots to deliver packages from a source location to destination. The exemplary embodiments are described with regard to drones that collect and deliver respective packages. The exemplary embodiments determine a predicted maintenance time for each of the drones such that the exemplary embodiments place each of the drones in an appropriate, respective position in a queue to collect its package. The proper placement in the position allows respective maintenance to be performed on the drone prior to a next delivery. Key benefits of the exemplary embodiments may include coordinating the maintenance of drones while maintaining a queue progression speed of the drone in a synchronized manner, thereby maximizing an uptime to utilize each drone. Detailed implementation of the exemplary embodiments follows.

Drone or robot-based delivery is being incorporated at increasing rates to deliver products to destinations (e.g., customer locations). Based on appropriate instructions, the drones may be configured to automatically collect a product (e.g., a pre-packaged product) from within a warehouse and deliver the product (e.g., as a package) to the customer. As a result of the drones being kept idle (e.g., not performing a constructive task or having a constructive act performed thereon such as maintenance), this results in a loss of productivity as an uptime of the drone is decreased. To optimize the robot-based delivery system, the system is expected to maximize the utilization of each drone. At the same time, the system is required to perform maintenance when required (e.g., ad hoc), on a time to time basis (e.g., at predetermined intervals), when an event is registered (e.g., an alert is triggered such as a low battery state). The maintenance may include a variety of tasks including, but not limited to, recharging a battery, replacing a battery, replacing a part such as a blade, or any other maintenance activity (e.g., cleaning internal or external components, applying or adding fluids such as oils as needed, etc.).

Conventional approaches have been proposed to utilize drones. For example, a conventional approach provides a station configured to deploy, recharge, or perform maintenance on an unmanned aerial vehicle (UAV). However, this conventional approach merely describes a station without any regard to coordinating a plurality of UAVs to optimize utilization of the UAVs in a robot-based delivery system. This conventional approach further does not determine the types of maintenance that is required that provides an input to further determinations in the coordination mechanism. In another example, a conventional approach provides an automated system and method for controlling a plurality of UAVs in which telemetric data is received from the UAVs such that control data is transmitted to the UAVs where the control data is indicative of plans for each of the plurality of UAVs and for a predetermined time period. However, this conventional approach simply determines how to operate the UAVs without an optimization determination that optimizes utilization of the UAVs in a robot-based delivery system. This conventional approach further is not directed to product handling or robot-based delivery systems such that associated operations and considerations are not incorporated in the purported solution of this conventional approach. In a further example, a conventional approach enables autonomous flight for a drone using a GPS device that guides the drone along a sequence of waypoints and enables it to return to a launching point where the drone may carry small payloads. However, this conventional approach focuses on individual drone performance without any regard to coordinating a plurality of UAVs to optimize utilization of the UAVs in a robot-based delivery system.

The exemplary embodiments provide a mechanism to increase the utilization of drones by minimizing idle time of the drones thereby maximizing uptime of the drones and determining an optimization solution by balancing the utilization of the drones while performing the necessary maintenance on the drones to perform another delivery. As any maintenance activity requires some amount of time, the exemplary embodiments identify the maintenance needs and determine the appropriate solution to addressing these maintenance needs while still coordinating the drone's next delivery task. As will be described in further detail below, the exemplary embodiments may utilize a delivery arrangement for packages to be delivered and drones to deliver the packages via a package conveyor and a drone conveyor, respectively. The delivery arrangement may allow packages to be moved to the drones and allow drones to be moved to the packages such that the maintenance needs of the drones may be met while awaiting to collect a package. The exemplary embodiments may provide the features described herein by determining a relative location for the drone to be positioned in the delivery arrangement based on an optimization solution that addresses both maintenance needs and maximizing drone utilization.

The exemplary embodiments are described with particular reference to the robot-based delivery system utilizing unmanned aerial vehicles or drones that are instructed to receive a package and deliver the package to a destination. However, the use of the drone is only exemplary. The exemplary embodiments may be utilized and/or modified to instruct any robot or automated device that is capable of receiving a package and delivering the package to the destination. Thus, any use of the drone may represent any delivery robot. In this manner, any term with a descriptor being a drone may also be for a delivery robot (e.g., a drone conveyor may represent any delivery robot conveyor).

FIG. 1 depicts an exemplary schematic diagram of a robot-based delivery system 100, in accordance with the exemplary embodiments. According to the exemplary embodiments, the robot-based delivery system 100 may be for a warehouse 105 including a delivery arrangement 110 and a coordination server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the warehouse 105 may be a building in which packages are assembled (e.g., housing a product in a packaging box and sealing the packaging box with the appropriate labels). The warehouse 105 may include sections (not shown) dedicated to housing various types of products in various quantities. When the warehouse 105 is identified as housing a requested product (e.g., by a central server of a delivery entity that catalogues the available products and locations in which the products are housed that identifies from among a plurality of warehouses that the warehouse 105 is selected based on a location of the destination), the package may be assembled. For example, the warehouse 105 may employ individuals who are directed to assemble the packages and place the packages on the delivery arrangement 110. In another example, the warehouse 105 may include automated devices receiving instructions to assemble a package for a product given a location within the warehouse 105 (e.g., aisle, level, palette, etc.) for subsequent placement on the delivery arrangement 110.

In the exemplary embodiments, the network 108 may be a communication channel capable of transferring data between connected devices. Accordingly, the components of the robot-based delivery system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the robot-based delivery system 100 that do not utilize the network 108. In a particular implementation, the network 108 may be a closed network (e.g., an intranet) that allows the components of the robot-based delivery system 100 to communicate with one another. Select components of the robot-based delivery system 100 may be configured to interact with outside networks (e.g., the Internet) such as when communicating with a central server of the delivery entity that identifies the warehouse 105 as housing a particular product to be packaged and delivered to a destination. The network 108 being a closed network may still allow components of the robot-based delivery system 100 that are outside the warehouse 105 to maintain a communication pathway with components that are within the warehouse 105.

In the exemplary embodiments, the delivery arrangement 110 may include a package conveyor 120 and a drone conveyor 130. The delivery arrangement 110 may be an arrangement that is used for the coordination of the packages that are outbound to respective destinations and automated delivery robots that deliver the packages to the respective destinations. The delivery arrangement 110 may identify the packages while held thereon and position the automated delivery robots in a determined location to collect and deliver a predetermined package while receiving any maintenance tasks prior to collection.

Figure 2:
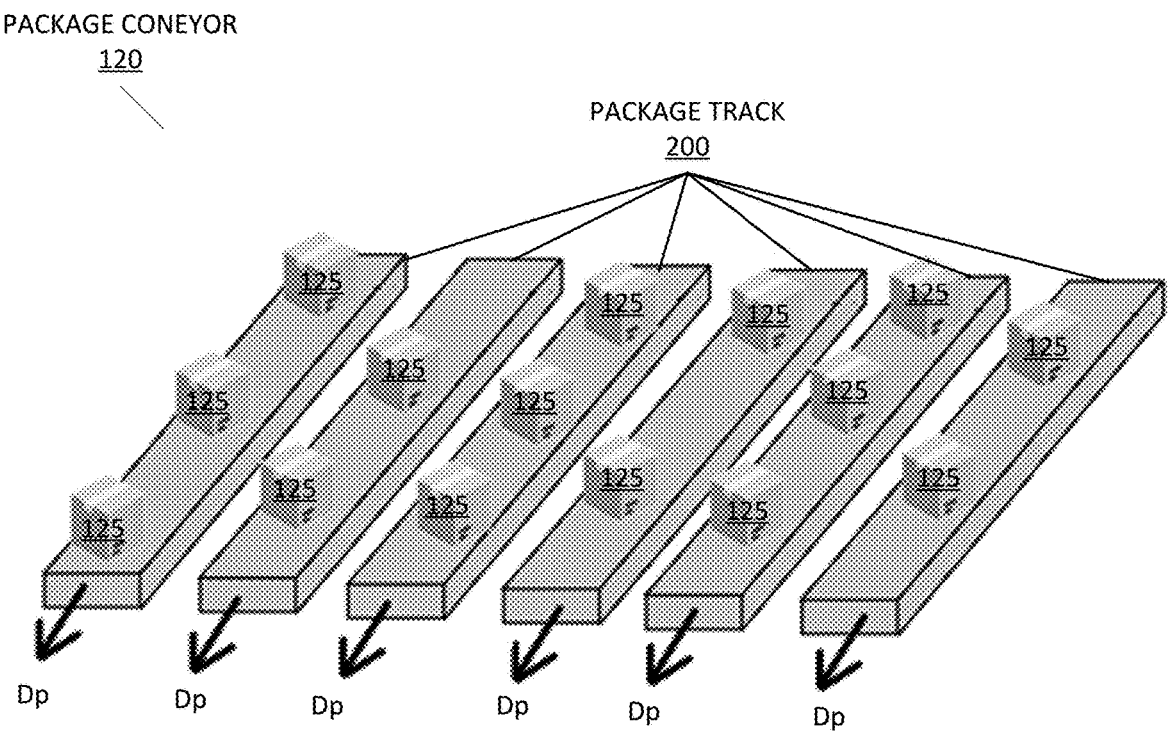
FIG. 2 depicts an exemplary package conveyor 120 of a delivery arrangement 110 in the robot-based delivery system 100, in accordance with the exemplary embodiments.
Figure 2:

FIG. 2 depicts an exemplary package conveyor 120 of a delivery arrangement 110 in the robot-based delivery system 100, in accordance with the exemplary embodiments. As illustrated, the package conveyor 120 may include a plurality of package tracks 200 that carry one or more packages 125. The package tracks 200 may each be moving in a common direction Dp at a common speed. The number of package tracks 200 shown in FIG. 2 is only illustrative and the exemplary embodiments may utilize any number of package tracks 200.

The packages 125 may be one or more products housed in a respective packaging box. The packages 125 may also include one or more delivery labels (e.g., placed on the packaging box) that indicate delivery information (e.g., source information, destination information, etc.). Each of the packages 125 may further include one or more identification labels (e.g., placed on the packaging box) combined with or separate from the delivery labels that uniquely identify the package 125 (e.g., a scannable code such as a barcode).

The package tracks 200 may include conveyor components. For example, the package conveyor 120 may be a belt conveyor in which each of the package tracks 200 may include a conveyor belt in a closed loop that provides a carrying medium for the packages 125 placed thereon moved via pulleys or drums. The package tracks 200 may also include one or more sensors (not shown). The sensors may be configured to read the identification labels on the package 125 that uniquely identify the package 125. For example, the sensors may be an imager, a barcode reader, etc. The sensors may further be configured to generate location information of the packages 125 on the package tracks 200. For example, the sensors may generate the location information that indicates which of the package tracks 200 that the package 125 is placed, a timestamp of when the package 125 is placed on the package track 200 (e.g., a location being determined based on a speed that the package conveyor 120 moves the package 125 on the package track 200), an actual location of the package 125 on the package conveyor 120 (e.g., a two-dimensional coordinate system may be virtually represented for the package conveyor 120 that indicates a specific location of the package 125), etc.

Figure 3:
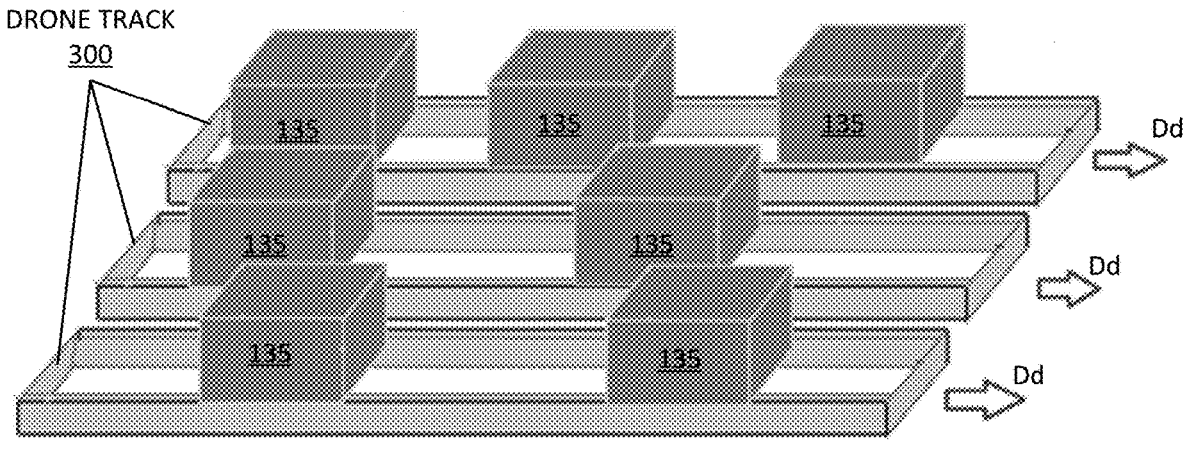
FIG. 3 depicts an exemplary drone conveyor 130 of the delivery arrangement 110 in the robot-based delivery system 100, in accordance with the exemplary embodiments.

FIG. 3 depicts an exemplary drone conveyor 130 of the delivery arrangement 110 in the robot-based delivery system 100, in accordance with the exemplary embodiments. As illustrated, the drone conveyor 130 may include a plurality of drone tracks 300 that carry one or more drones 135. The drone tracks 300 may include components (e.g., conveyor components, sensors, etc.) substantially similar to the package tracks 200. The drones 135 may represent the automated delivery robots used in collecting and delivering the packages 125. The drone tracks 300 may each be moving in a common direction Dd at a common speed. The number of drone tracks 300 shown in FIG. 3 is only illustrative and the exemplary embodiments may utilize any number of drone tracks 300.

The drones 135 may be one or more unmanned aerial vehicles (UAVs) configured with a load carrying device as well as an air movement device. For example, each of the drones 135 may be equipped with articulating arms that hold the package, move the package into and out of a carriage, etc. In another example, each of the drones 135 may be equipped with a flight device (e.g., one or more propellers having one or more blades), an engine (e.g., to actuate the flight device), a power supply (e.g., a battery to provide electrical energy to the engine), etc. The drones 135 may also be configured with a processor, a location device, etc. The processor may be configured to control the movement of the drone 135 based on instructions that are received. The processor may also be configured to generate performance information with regard to performance of the drone 135 (e.g., a battery level, an energy use level such as a ratio of distance to energy use, etc.). The performance information may be indicative of operational parameters in operating the drone 135 including mechanical operations to move the drone 135, electrical operations in powering and utilizing electrical components, electromechanical operations, etc. The location device may be a GPS, a triangulation component, a signal processing device (e.g., RSSI), etc. to determine a geographic location of the drone 135, determine a flight path to reach a destination from the warehouse 105 and return to the warehouse 105, determine distance information to travel in the flight path, etc. The drones 135 may further be configured with a communication device. For example, the drones 135 may each include a transceiver configured to wirelessly exchange data.

The exemplary embodiments are described with regard to the delivery arrangement 110 including the package conveyor 120 and the drone conveyor 130 utilizing conveyors. However, this implementation utilizing conveyors is only for illustrative purposes. The delivery arrangement 110 may utilize any means by which the packages 125 and the drones 135 may be moved for the coordination to be orchestrated. For example, the packages 125 may be carried on independently moving ground vehicles that collect the package 125, move to a loading area, and await the package 125 to be collected by the drone 135. The exemplary embodiments may utilize any mechanism by which a package 125 is positioned at a known location and oriented such that the drone 135 may properly collect the package 125.

The exemplary embodiments are described with regard to the package conveyor 120 having the package tracks 200 that each move along the direction Dp and the drone conveyor 130 having the drone tracks 300 that each move along the direction Dd. In this manner, as will be described in further detail below, the determination of the locations of the packages 125 and the drones 135 that have been placed on the package conveyor 120 and the drone conveyor 130 may be performed with less complexity. The common direction may also enable subsequent locations of drones 135 yet to be placed on the drone conveyor 130 to be determined. However, this configuration of a common direction of the tracks in the respective conveyor is only for illustrative purposes. The exemplary embodiments may utilize the package conveyor 120 and/or the drone conveyor 130 such that the package tracks 200 and/or the drone tracks 300 move in independent directions (e.g., a first track moves in a first direction while a second track moves in a second, different direction).

The package tracks 200 and/or the drone tracks 300 are also illustrated with a parallel orientation. However, the parallel orientation is only illustrative. Other orientations may be utilized. The package tracks 200 and/or the drone tracks 300 may also utilize a single track that is parallelly looped (e.g., an S-pattern where a first end of a first track is connected to a first end of a second track, a second end of the second track is connected to a first end of a third track, etc.). In this manner, the packages 125 and/or the drones 135 may move along a known, fixed path. In another manner, the package conveyor 120 may utilize a closed loop in which the packages 125 may continue to remain on the package track 200 until the drone 135 has collected the package 125.

The exemplary embodiments are also described with regard to the package conveyor 120 having the package tracks 200 that each move along a common direction at a constant speed. In this manner, as will be described in further detail below, the determination of the locations of the packages 125 and the drones 135 that have been placed on the package conveyor 120 and the drone conveyor 130, respectively, may be performed with less complexity. The common direction may also enable subsequent locations of the drones 135 yet to be placed on the drone conveyor 130 to be determined. However, this configuration of a constant speed of the tracks in the respective conveyor is only for illustrative purposes. The package tracks 200 and/or the drone tracks 300 may be configured to dynamically adjust the speeds to compensate for a variety of factors (e.g., an increase in the speed may allow for a faster collection as a result of an increased number of packages 125 with an increased number of drones, a decrease in speed may allow for greater maintenance tasks to be performed, etc.).

The exemplary embodiments are further described with the package conveyor 120 and the drone conveyor 130 having common characteristics. For example, the package conveyor 120 and the drone conveyor 130 may each have the same number of the package tracks 200 and the drone tracks 300. In another example, the package conveyor 120 and the drone conveyor 130 may each have the package tracks 200 and the drone tracks 300 moving the packages 125 and the drones 135 at the same speed. However, the number of tracks and the speed being the same between the package conveyor 120 and the drone conveyor 130 is only illustrative. In other exemplary embodiments, the package conveyor 120 and the drone conveyor 130 may have a different number of tracks and/or utilize a different speed of the tracks. As will be described in further detail below, the number of tracks and the speed of the tracks may be continuously known factors such that the exemplary embodiments may make determinations with accuracy.

Figure 4:
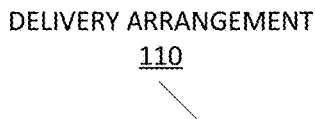
FIG. 4 depicts an exemplary delivery arrangement 110 including the package conveyor 120 of FIG. 2 and the drone conveyor 130 of FIG. 3, in accordance with the exemplary embodiments.

FIG. 4 depicts an exemplary delivery arrangement 110 including the package conveyor 120 of FIG. 2 and the drone conveyor 130 of FIG. 3, in accordance with the exemplary embodiments. As illustrated, the drone conveyor 130 may be placed over the package conveyor 120 to create a cross pattern. For example, the drone tracks 300 of the drone conveyor 130 may be positioned over the package tracks 200 of the package conveyor 120 in a perpendicular orientation where the drone tracks 300 have a horizontal path (e.g., as illustrated in FIG. 4) and the package tracks 200 have a vertical path (e.g., as illustrated in FIG. 4). The direction Dp for the package tracks 200 may be from left to right (e.g., as illustrated in FIG. 4) and the direction Dd for the drone tracks 300 may be from top to bottom (e.g., as illustrated in FIG. 4).

The delivery arrangement 110 may be configured with the above noted dispositions of the package conveyor 120 and the drone conveyor 130 such that each of the drone tracks 300 may be positioned over or "intersect" (e.g., when viewed from above) each of the package tracks 200. In this manner, a drone 135 placed on one of the drone tracks 300 may potentially be used to collect a package 125 on any of the package tracks 200. As will be described in further detail below, this configuration of the delivery arrangement 110 may be used to coordinate and orchestrate the drones 135 via the drone conveyor 130 to collect and deliver the packages 125 that are placed on the package conveyor 120. With the package conveyor 120 defining a package path along which the package 125 moves while placed thereon and the drone conveyor 130 defining a drone path along which the drone 135 after having landed thereon, the package track 200 and the drone track 300 may create a collection point (e.g., an intersection point when viewed from above) where the drone 135 is directly over the package 125 that is assigned thereto so that the drone 135 may collect the package 125 and perform the delivery task.

In the exemplary embodiments, the coordination server 140 may include a communication program 142 and a coordination program 144, and be in a communicative relationship with the delivery arrangement 110 and the drones 135. The coordination server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the coordination server 140 is shown as a single device, in other embodiments, the coordination server 140 may be comprised of a cluster or plurality of computing devices, working together or working independently. The coordination server 140 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including coordination processing 96 according to the exemplary embodiments).

In the exemplary embodiments, the communication program 142 may be a software, hardware, and/or firmware application configured to exchange data with the various components of the robot-based delivery system 100. For example, the communication program 142 may exchange data with the delivery arrangement 110 and the drones 135 (e.g., either on or off the drone conveyor 130). The communication program 142 may gather information about the components of the robot-based delivery system 100 for subsequent processing to provide the features of the exemplary embodiments. The coordination server 140 may be configured with one or more communication protocols such as those described above with regard to the network 108. In this manner, the communication program 142 may exchange data with the components of the robot-based delivery system 100 using one or more of these communication protocols (e.g., use a near field communication protocol for components housed in the warehouse 105, use a long range or network communication protocol for the drones 135 that are outside the warehouse 105, etc.).

In the exemplary embodiments, the coordination program 144 may be a software, hardware, and/or firmware application configured to coordinate the drones 135 in collecting and delivering the packages 125 based on various inputs from the package conveyor 120, the packages 125, the drone conveyor 130, and the drones 135 along with other information that may be available. For example, the coordination program 144 may access a data repository (not shown) that stores historical performance data including maintenance time information, maintenance type information, etc. that may be determined based on various machine learning techniques and/or modeling techniques. As will be described in further detail below, the coordination program 144 may track the drones 135, the packages 125, the drone conveyor 130, and the package conveyor 120 along with information exchanged therewith to determine a manner in which to position the drones 135 on the drone conveyor 130 to allow maintenance tasks to be performed where the maintenance is completed prior to (e.g., immediately prior to) the drone 135 collecting the package 125 for a next delivery. For example, the coordination program 144 may determine or know the direction and speed of each of the package tracks 200 of the package conveyor 120 and the packages 125 that have been placed thereon as well as for the drone tracks 300 of the drone conveyor 130 and the drones 135 that have been placed thereon in addition to the drones 135 that have yet to be placed on the drone tracks 300.

Figure 5:
FIG. 5 depicts an exemplary flowchart of a method 500 illustrating the operations of a coordination program 144 incorporated in the robot-based delivery system 100 in coordinating the robot-based delivery system 100, in accordance with the exemplary embodiments.
Figure 5:
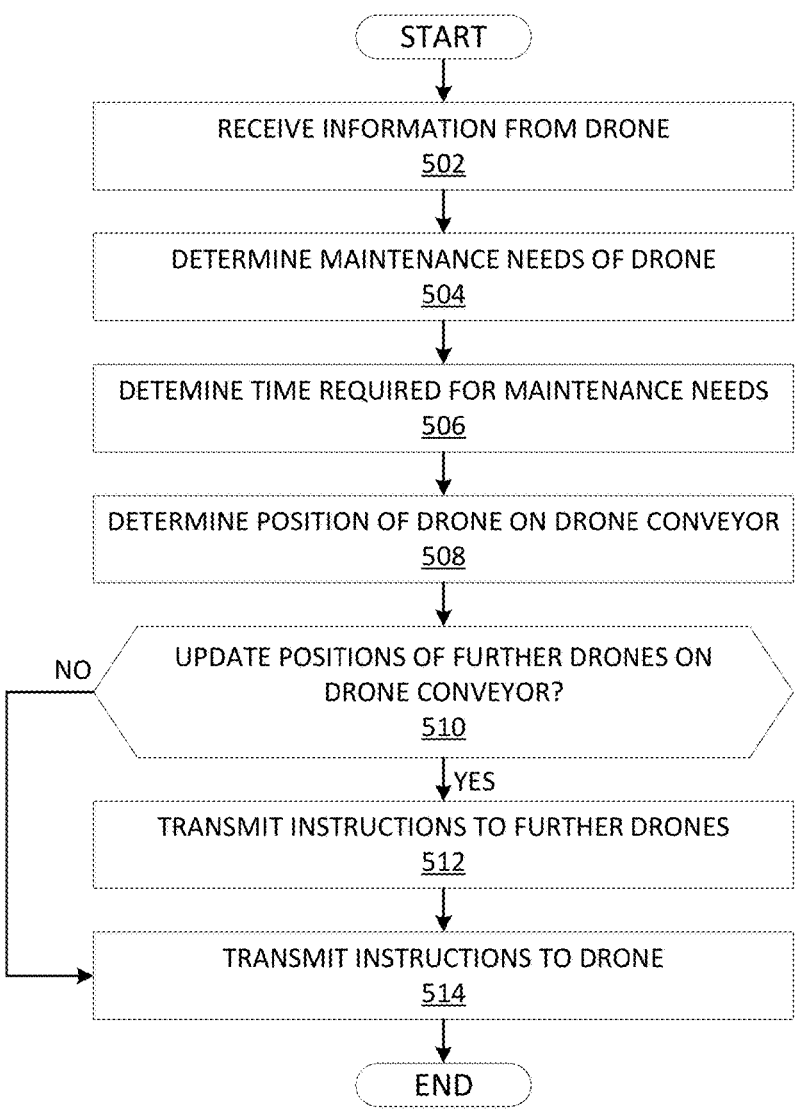

FIG. 5 depicts an exemplary flowchart of a method 500 illustrating the operations of the coordination program 144 incorporated in the robot-based delivery system 100 in coordinating the robot-based delivery system 100, in accordance with the exemplary embodiments. The method 500 may relate to operations that are performed by the coordination program 144 in coordinating the drones 135 to deliver the packages 125. The method 500 will be described from the perspective of the coordinating server 140 via the coordination program 144.

The coordination program 144 may receive information from the drone 135 (step 502). In a continuous monitoring operation, the coordination program 144 may receive information about the drones 135 such as the performance information that is generated by the drones 135. The coordination program 144 may receive the performance information at one or more different times from the drones 135. For example, the coordination program 144 may constantly or at predetermined intervals receive the performance information from each of the drones 135. The coordination program 144 may receive the performance information during times when the drones 135 are within the warehouse 105, regardless of whether the drones 135 are within the warehouse 105 (e.g., provide the performance information while the drones 135 are within the warehouse 105 and outside the warehouse 105 while making a delivery), etc. In another example, the coordination program 144 may receive the performance information upon the drones 135 returning from a delivery. The drones 135 may have generated the performance information which is prepared for transmission when the drone 135 has returned to the warehouse 105. In an exemplary embodiment, the robot-based delivery system 100 may utilize IoT feeds in which the drones 135 provide the performance information.

The drones 135 may include one or more internal sensors (not shown) that track the various parameters of the performance information. For example, the drones 135 may include a battery meter that measures a current amount of battery power remaining. In another example, the drones 135 may include levels, gyroscopes, accelerometers, etc. that tracks how the drone 135 flies, moves, etc. from the warehouse 105 to the destination and back (e.g., whether the drone 135 remains level, whether the drone 135 wobbles, etc.). In a further example, the drones 135 may include a processing power meter that measures the processing power that is being used that may also be tracked based on a ratio of the power consumption.

The drones 135 may provide additional information. For example, the additional information from a given one of the drones 135 may uniquely identify that drone 135. The identity of the drone 135 may also have a profile (e.g., stored in a data repository (not shown)) that indicates a capacity, specification, etc. that defines the various capabilities and mechanisms that the drone 135 uses to collect and deliver the packages 125. The capacity may define a range of loads that may be collected and delivered by the drone 135. The specification may define expected performance ranges of the various parameters that are measured by the sensors. The expected performance ranges may be based on the load being carried. For example, a heavier load may require a greater amount of power and a lesser maximum distance that may be traveled including a return trip without the load whereas a lighter load may require a lesser amount of power and a greater maximum distance that may be traveled including a return trip without the load.

The coordination program 144 may determine maintenance needs for the drone 135 (step 504). Based on the performance information and the profile (e.g., the expected performance ranges) for a given one of the drones 135, the coordination program 144 may determine one or more maintenance needs that the drone 135 may require.

The coordination program 144 may utilize various modeling techniques, artificial intelligence, machine learning, etc. that correlate the performance information to the expected performance ranges indicated in the profile for the drone 135. For example, the coordination program 144 may utilize machine learning to identify mechanical issues with particular performance measurements. In a particular example, the drone 135 may include a plurality of motors and propellors with each propellor having a plurality of blades. The sensors on the drone 135 may have generated sensory data with regard to an orientation measurement during flight in which the drone 135 has an unsteady level. Based on the machine learning models, the coordination program 144 may receive this performance information and determine that the drone 135 may have a motor or blade failure that caused the unsteady level (e.g., the drone 135 may have an expected steadiness metric range where the unsteady level is outside the expected steadiness metric range). In another example, the coordination program 144 may utilize artificial intelligence to identify electrical issues with particular performance measurements. In a particular example, the drone 135 may measure that a flight having a known distance utilizes an amount of power that exceeded an expected amount. Based on the artificial intelligence models, the coordination program 144 may receive this performance information and determine that the battery on the drone 135 may require replacement, the power conductors may require inspection or replacement, etc. The coordination program 144 may utilize other information and the appropriate models to specifically identify the potential issue that requires maintenance (e.g., heat levels of the electrical conductors). In a further example, the coordination program 144 may receive performance information indicating a measure of the remaining power in a battery of the drone 135. Based on unassigned packages 125 yet to be collected and their respective destinations along with potential power in the battery should a recharge operation be performed prior to collection of the package 125, the coordination program 144 may assign one of the unassigned packages 125 to the drone 135 and determine a minimum amount to recharge the battery once the unassigned package 125 is assigned to the drone 135 where the minimum amount to recharge may be based on a current power level of the battery, the specification of the drone 135, and the assigned delivery task including distance to be traveled, weight of the package 125, weather conditions, etc.

The coordination program 144 may categorize or classify the types of maintenance tasks that may be required for the drone 135. For example, the maintenance tasks may be categorized based on whether maintenance may be performed with equipment and any parts already positioned with the delivery arrangement 110 or whether additional equipment or parts are required. The warehouse 105 may be equipped with a plurality of different maintenance robots configured to perform a plurality of maintenance tasks on the drones 135. The maintenance robots may be positioned near the delivery arrangement 110 for the maintenance tasks to be performed once the drones 135 have been placed on the drone conveyor 130. The maintenance robots may have access to various parts (e.g., replacement blade, replacement carriage, etc.) should the maintenance tasks require a part of the drone 135 to be replaced. The maintenance robots may also have access to a power source so that a contact of the power source is paired with a corresponding contact of the drone 135 to recharge the battery of the drone 135. In another exemplary embodiment, the drone tracks 300 may be configured with contactless charging techniques such that the drone 135 being placed on one of the drone tracks 300 may trigger the recharge operation on the battery of the drone 135. The maintenance tasks may also require additional components that are not readily available (e.g., in proximity of the maintenance robots) or require a manual operation by a user (e.g., the maintenance robot may not be configured for a particularly complex maintenance task or the specific maintenance task may be unknown based on the performance information). In this manner, according to an exemplary implementation, the coordination program 144 may classify the different maintenance tasks based on a timing requirement where standard maintenance tasks that the maintenance robots may handle with equipment and/or parts readily available have a relatively low timing requirement whereas complex maintenance tasks that the maintenance robots may not handle or the equipment and/or parts are not readily available have a relatively high timing requirement. The maintenance tasks may vary in the timing requirements and the coordination program 144 may classify each of these maintenance tasks accordingly across a range of timing requirement values.

In another exemplary implementation in determining the maintenance tasks to be performed on the drones 135, the coordination program 144 may utilize indirect information about the drones 135. The indirect information may be indirect performance information as generated by a component or device that is not a part of the drones 135. For example, the warehouse 105 may include imagers or other types of sensors that monitor the area within and/or outside the warehouse 105. Accordingly, when the drones 135 are within a proximity to the sensors or enter an operating area of the sensors, the indirect performance information may be generated. The coordination program 144 may receive the indirect performance information. The coordination program 144 may determine the maintenance needs of the drones 135 based on the performance information directly provided by the drones, the indirect performance information provided by the sensors of the warehouse 105, or a combination thereof.

The coordination program 144 may determine a time required for the maintenance needs of the drone 135 based on the one or more maintenance tasks to be performed on the drone 135 (step 506). For example, as described above, the coordination program 144 may utilize the classification of the maintenance tasks to determine the time required to perform the maintenance tasks identified for the drone 135. The coordination program 144 may determine the timing requirements of the maintenance tasks based on various sources of information. For example, the coordination program 144 may utilize historical learning to estimate the time required for the different types of maintenance activity. The coordination program 144 may also factor the availability of the maintenance robots and/or personnel to perform the identified maintenance tasks. For example, a maintenance robot configured to perform one of the identified maintenance tasks may be preoccupied performing the same maintenance tasks on another one of the drones 135. Accordingly, the completion time on this other drone 135 may be added to the time requirement of the current drone 135 including any movement time to the current drone 135, preparation time, etc.

The coordination program 144 may further determine which of the packages 125 to assign to the drone 135 for a next delivery. In determining an optimization solution, the coordination program 144 may determine which of the packages 125 are yet to be assigned. In an exemplary embodiment, the coordination program 144 may select one of the unassigned packages 125 and assign it to the drone 135 for the next delivery. For example, the coordination program 144 may utilize the specification of the drone 135 that may indicate a load that is capable of being delivered by the drone 135. In this manner, the coordination program 144 may have an input to make subsequent determinations. The coordination program 144 may iterate this process, particularly if the subsequent determinations indicate that the drone 135 may be incapable of completing the next delivery to the assigned package 125 based on, for example, maintenance needs, time for preparation to collect the assigned package 125, etc. The coordination program 144 may select another unassigned package 125 for the drone 135. The coordination program 144 may further be configured to dynamically modify the assignment of packages 125. For example, when a drone 135 becomes available for a next delivery, the drone 135 may be incapable of being assigned one of the remaining unassigned packages 125 due to a variety of reasons that results in an efficiency threshold of the robot-based delivery system 100 from being met. In such a scenario, the coordination program 144 may select an already assigned one of the packages 125 and re-assign this package to the drone 135. This process may continue until each of the drones 135 has been assigned a package for the next delivery. In this manner, the coordination program 144 may determine the appropriate maintenance needs of the drone 135 assigned to a given one of the packages 125 (e.g., whether more time is needed to charge a battery for the drone 135 to complete the delivery).

The coordination program 144 may determine a position of the drone 135 on the drone conveyor 130 (step 508). The coordination program 144 may determine a select one among the drone tracks 300 and a location on the selected drone track 300 on which to position the drone 135. The coordination program 144 may select the drone track 300 and position the drone 135 on this drone track 300 based on the maintenance needs of the drone, the time required to perform the one or more maintenance tasks associated with the maintenance needs, and the package 125 that is assigned to the drone 135 for the next delivery.

Using the time required to perform the maintenance tasks of a selected one of the drones 135, the coordination program 144 may select the appropriate one of the drone tracks 300 and place the drone 135 thereon at an appropriate position on the selected drone track 300 so that a delivery queue progression speed and maintenance time for the selected drone 135 and other drones 135 are synchronized. In this manner, the drones 135 may be prepared for a next delivery for an assigned one of the packages 125. Based on the types of maintenance tasks that are required on the drone 135 (e.g., battery replacement, blade replacement, recharging, oiling, etc.) that may be properly classified, the coordination program 144 may determine the location on the drone track 300 in order to perform all required maintenance tasks on the drone 135 while the drone 135 is moved into position via the drone track 300 to collect the assigned package 125. In a particular implementation, the coordination program 144 may select the drone track 300 and the location thereon to accommodate one or more types of maintenance. Specifically for a plurality of maintenance tasks to be performed, the drone 135 may land on the drone track 300 at a determined location where multiple maintenance tasks may be performed in parallel. In another implementation, the drone 135 may be moved from one of the drone tracks 300 to another one of the drone tracks 300 so that the time required to perform the maintenance tasks may be optimized (e.g., to complete the maintenance tasks), thereby maximizing the utilization of the drone 135.

As described above, the coordination program 144 may determine which of the drone tracks 300 on which to land a selected one of the drones 135 as well as a location on the identified drone track based on an optimization solution. The coordination program 144 may determine the optimization solution as there may be at least one more of the drones 135 that is placed on the drone conveyor 130 with particular regard to the same selected drone track 300 for the current drone 135. Thus, in determining the optimization solution, the coordination program 144 may estimate a distribution of different types of maintenance tasks for each of the drones 135 that are and will be placed on the drone tracks 300 of the drone conveyor 130. The coordination program 144 may determine the optimization solution by incorporating the time required for the maintenance tasks and coordinating that time and movement each of the drones 135 on the drone conveyor 130 to collect its assigned one of the packages 125 upon completion of the respective one or more of the maintenance tasks. The coordination program 144 may further determine the optimization solution by incorporating a variable of dynamically altering a length of the drone conveyor 130 (e.g., by moving a drone 135 from one of the drone tracks 300 to another one of the drone tracks 300) and utilizing the maintenance robots that cover different portions of the drone conveyor 130 that address different types of maintenance tasks.

The coordination program 144 may further determine the optimization solution by incorporating further time factors as the time required to perform the maintenance tasks may not be the only time considerations. In this manner, the coordination program 144 may determine an additional time related to non-maintenance tasks that are required to be performed to prepare the drone 135 for the assigned delivery task. As each drone 135 requires a time to collect and secure (e.g., clamp the package 125, place the package 125 into a carriage, etc.) the respectively assigned one of the packages 125 on the package conveyor 120 as well as need time to take off, the coordination program 144 may extend the time required to perform the maintenance tasks with this further time consideration. The coordination program 144 may utilize historical information that historically tracks the time required for collecting the packages 125 by the drones 135. The coordination program 144 may also estimate the speed of the drone conveyor 130 and the package conveyor 120 to further estimate a particular distance that the drone 135 moves on the drone conveyor 130 to satisfy the total time for the drone 135 (e.g., the time required for the one or more maintenance tasks to be completed and the additional time considerations). In this manner, the location of the drone 135 on the drone conveyor 130 may be synchronized with the collection of the assigned package 125 by the drone 135. In a particular exemplary embodiment, the coordination program 144 may determine the optimization solution individually for a given drone 135 as well as holistically for the robot-based delivery system 100 including a plurality of the drones 135 such that upon completion of the maintenance tasks for each of the drones 135, the drones 135 will immediately collect the assigned package 125 and be ready for delivery.

In an illustrative exemplary embodiment illustrated in FIG. 4, the robot-based delivery system 100 may include a plurality of packages 125 and a plurality of drones 135 including a drone 135*a*, a drone 135*b*, and a drone 135*c*. The packages 125 may each include one or more products and may each include delivery labels and identification labels. The packages 125 may already be placed on the package conveyor 120 of the delivery arrangement 110. The coordination program 144 may monitor packages 125 that have been collected and removed from the package conveyor 120 as well as packages 125 that have been processed and placed on the package conveyor 120. The coordination program 144 may also continuously monitor over time where the packages 125 that are on the package conveyor 120 are positioned including which of the package tracks 200 and a location along the package tracks 200.

The drones 135 shown in FIG. 4 may be delivery robots that have already been placed on the drone conveyor 130. There may be a plurality of the drones 135 that have already been placed on the drone conveyor 130 including the drone 135*c*. There may also be the drones 135*a* and 135*b* that are not yet placed on the drone conveyor 120. The drones 135*a* and 135*b* may be drones 135 that are to collect and deliver a next one of the packages 125 on the package conveyor 120 that has not been assigned to one of the drones 135 already on the drone conveyor 120. For example, the drone 135*a* and/or the drone 135*b* may have recently returned from a delivery, completed an off assembly-line repair (e.g., not on the delivery arrangement 110), have been newly added as one of the drones 135, etc.

In the manner described above, the coordination program 144 may individually determine a location on the drone conveyor 130 on which the drones 135*a* and 135*b* are to land based on the one or more maintenance tasks to be performed on the drones 135*a* and 135*b* (e.g., as determined by the coordination program 144 based on various direct and indirect performance information). As illustrated, the coordination program 144 may have determined that the drone 135*a* is to land on the drone conveyor 130 at location La and the drone 135*b* is to land on the drone conveyor 130 at location Lb. As the drone tracks 300 are moving in the direction Dd (e.g., from left to right as illustrated in FIG. 4), there may be relatively less time for the drones 135 to spend on the drone tracks 300 if landing on one side of the drone track 300 as opposed to the other side. For example, as seen in FIG. 4, if landing further to the right, the drone 135 has less available time to spend on the drone conveyor 130 with the drone track 300 moving at a particular speed and the drone 135 having less space on the drone track 300. If landing further to the left, the drone 135 has more available time to spend on the drone conveyor 130 with the drone track 300 moving at a particular speed and the drone 135 having more space on the drone track 300. As the location of the drones 135*a* and 135*b* being based on the time to complete the one or more maintenance tasks, the drone 135*a* may require one or more maintenance tasks that need a relatively longer amount of time to complete prior to collecting an assigned one of the packages 125. The drone 135*b* may require one or more maintenance tasks that need a relatively shorter amount of time to complete prior to collecting an assigned one of the packages 125. Accordingly, in the illustrative exemplary embodiment, the coordination program 144 may determine that the drone 135*a* that requires more time is to land at location La and the drone 135*b* that requires less time is to land at location Lb.

The coordination program 144 may determine whether positions of further ones of the drones 135 that are already on the drone tracks 300 of the drone conveyor 130 are to be updated (decision 510). As described in detail above, the coordination program 144 may determine the optimization solution individually and holistically. In determining the optimization solution holistically, the placement of a given one of the drones 135 yet to be placed on the drone conveyor 130 may result in one or more other drones 135 to be moved to accommodate the given drone 135.

As a result of the further ones of the drones 135 having their respective positions updated (decision 510, "YES" branch), the coordination program 144 may determine the updates and transmit the appropriate instructions to the further ones of the drones 135 (step 512). Thus, to optimize the utilization of the drones 135, the coordination program 144 may dynamically reposition the drones 135 on the drone conveyor 130 by transmitting the instructions that cause these drones 135 to move to the updated location on the drone conveyor 130. This orchestration of the drones 135 may create an appropriate space to accommodate for the given drone 135. With reference again to the illustrative exemplary embodiment of FIG. 4, the drone 135*c* may have been located at the location Lb. However, as a result of the coordination program 144 determining that the drone 135*b* is to land at location Lb, the coordination program 144 may have instructed the drone 135*c* to move further along the drone track 300 (e.g., the drone 135*c* has already had its maintenance tasks completed). In this manner, the coordination program 144 may ensure that there is sufficient space for the drone 135*b* to land as determined. As a result of the further ones of the drones 135 having their respective positions maintained (decision 510, "NO" branch) or as a result of the further ones of the drones 135 having updated positions (step 512), the coordination program 144 may transmit the appropriate instructions to the drone 135 that is to be placed on the drone conveyor 130 (step 514). With the appropriate location on the drone conveyor 130 being available and as a result of receiving the instruction, the given drone 135 may land on the drone conveyor 130 at the determined location.

The exemplary embodiments are configured to coordinate a robot-based delivery system. The exemplary embodiments provide an optimization solution that synchronizes performing maintenance tasks for delivery robots and preparing the delivery robots for ensuing deliveries of assigned packages. In collecting performance information of the delivery robots, the exemplary embodiments may determine one or more maintenance tasks that an individual delivery robot requires prior to the next delivery. The exemplary embodiments may also determine a time required to complete the one or more maintenance tasks and prepare the delivery robot for the next delivery. Based on these determinations, the exemplary embodiments may further determine a location on which to land the delivery robot on a delivery arrangement such that the performance of the maintenance tasks and preparation for the collection of the package for the next delivery is synchronized.

Figure 6:
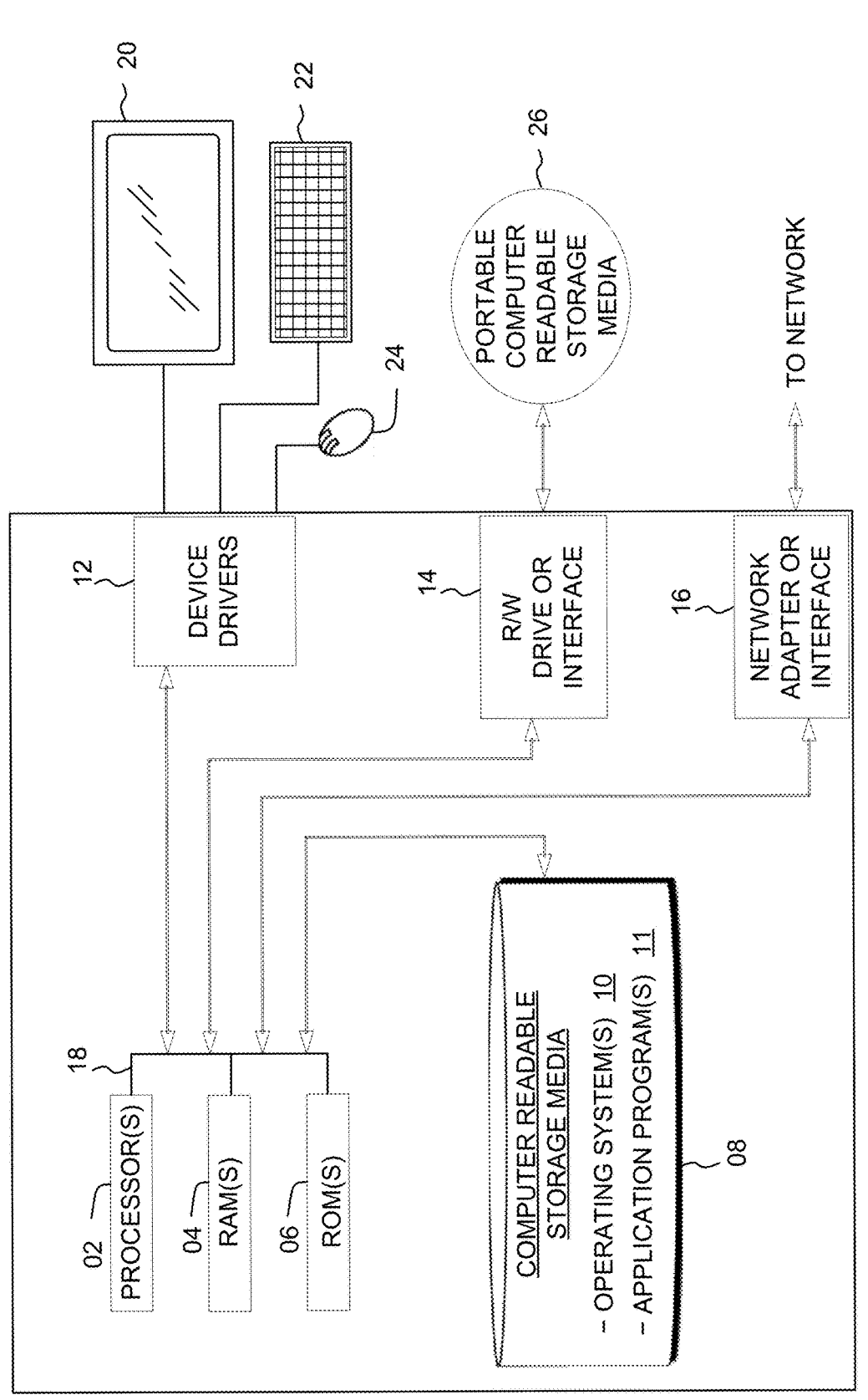
FIG. 6 depicts an exemplary block diagram depicting the hardware components of the robot-based delivery system 100 of FIG. 1, in accordance with the exemplary embodiments.

FIG. 6 depicts a block diagram of devices within the robot-based delivery system 100 of FIG. 1, in accordance with the exemplary embodiments. It should be appreciated that FIG. 6 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
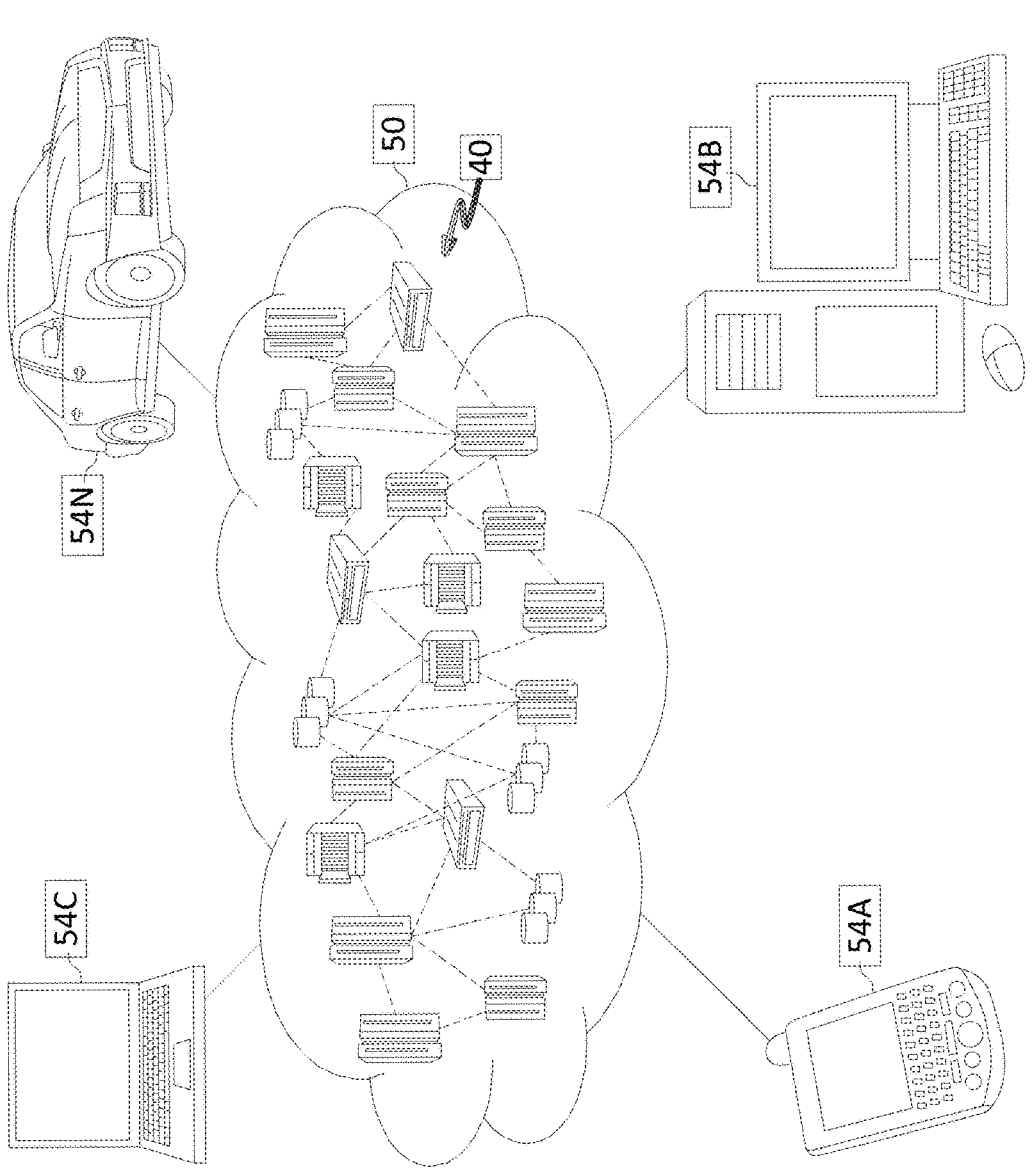
FIG. 7 depicts a cloud computing environment, in accordance with the exemplary embodiments.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
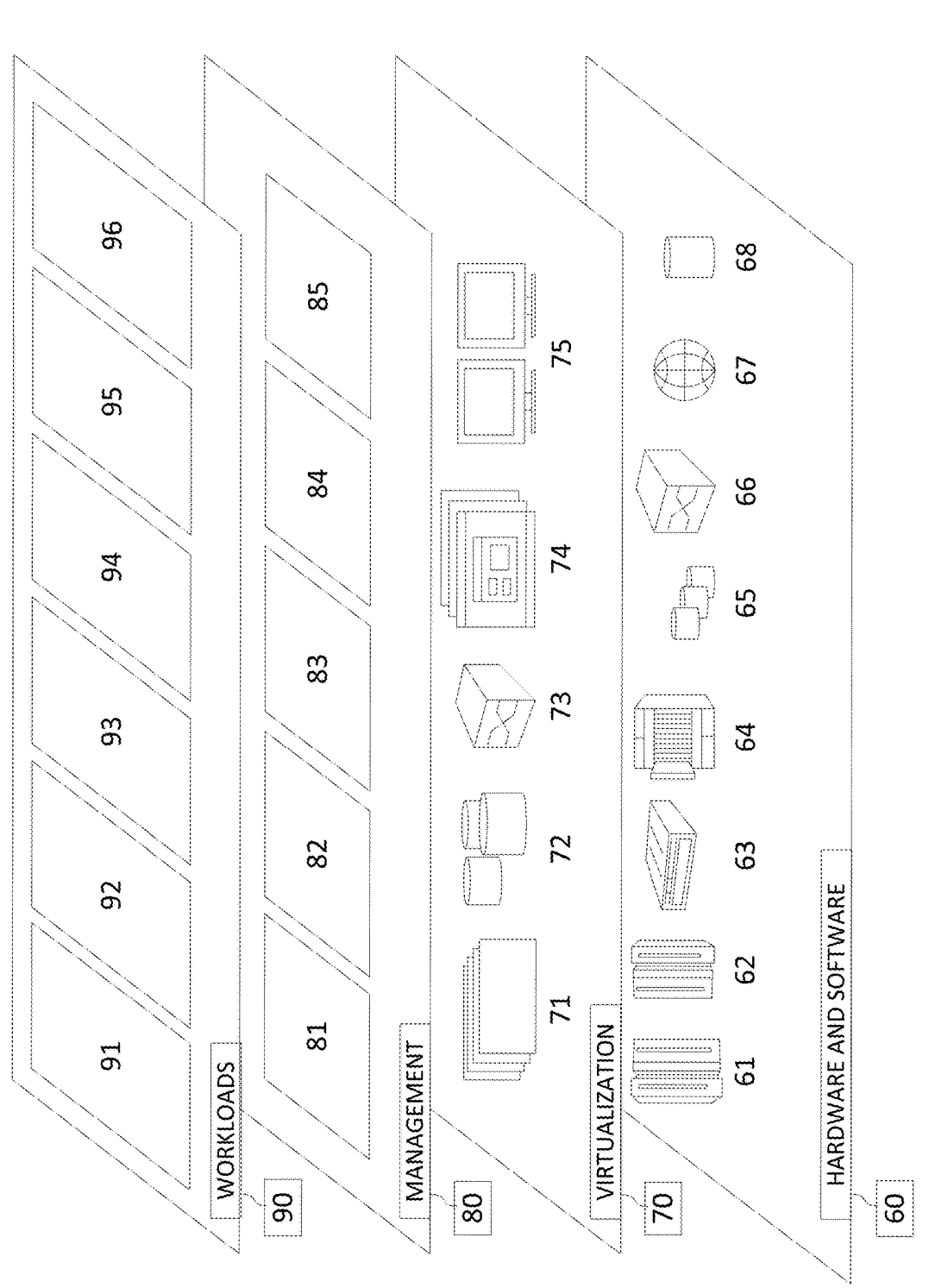
FIG. 8 depicts abstraction model layers, in accordance with the exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and coordination processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:

Receiving, by one or more processors, performance information associated with a first delivery robot of a robot-based delivery system, the performance information indicative of operational parameters of the first delivery robot;

Determining, by the one or more processors, one or more maintenance tasks to be performed on the first delivery robot prior to a delivery task in collecting a package and delivering the package based on the performance information;

Determining, by the one or more processors, a time required to perform the one or more maintenance tasks;

Determining, by the one or more processors, a location on a delivery arrangement of the robot-based delivery system based on the one or more maintenance tasks and the time, wherein the delivery arrangement including a package conveyor on which the package is placed and moved therealong and a delivery robot conveyor on which the first delivery robot is to be placed and moved therealong; and Transmitting, by the one or more processors, an instruction to the first delivery robot to land on the delivery robot conveyor that includes a plurality of delivery robots at the location such that the one or more maintenance tasks being performed is synchronized with the first delivery robot being prepared for the delivery task, wherein the instruction positions the first delivery robot between a second delivery robot from the plurality of delivery robots and a third delivery robot from the plurality of delivery robots;

Landing the first delivery robot autonomously in response to the instruction.

2. The method of claim 1, wherein the first delivery robot is a drone.

3. The method of claim 1, wherein determining the one or more maintenance tasks is based on the performance information relative to an expected performance range to a corresponding one of the operational parameters.

4. The method of claim 1, wherein the package conveyor moves the package in a first direction and, upon landing, the delivery robot conveyor moves the first delivery robot in a second direction, the package moving along a package path on the package conveyor and the first delivery robot moving along a delivery robot path on the delivery robot conveyor, the first delivery robot being positioned over the package after the one or more maintenance tasks are completed for the first delivery robot to collect the package.

5. The method of claim 1, further comprising:

determining whether the second delivery robot is to be moved to accommodate the location on which the first delivery robot is to land;

as a result of the second delivery robot being moved, determining a further location for the second delivery robot; and transmitting a further instruction to the second delivery robot.

6. The method of claim 1, wherein the delivery robot conveyor comprises a plurality of delivery robot tracks on which the first delivery robot is moved therealong, the method further comprising:

determining whether the first delivery robot is to move from a first one of the plurality of delivery robot tracks to a second one of the plurality of delivery robot tracks based on the time.

7. The method of claim 1, wherein the package is one of a plurality of packages on the package conveyor, the method further comprising:

determining the package from among the plurality of packages to be assigned to the first delivery robot, wherein the one or more maintenance tasks are based on delivery information associated with the package.

8. The method of claim 1, further comprising:

determining an additional time required to prepare the first delivery robot for the delivery task, the additional time being based on non-maintenance tasks.

9. The method of claim 1, wherein the performance information is generated by one of internal sensors of the first delivery robot monitoring the operational parameters, sensors of a warehouse in which the robot-based delivery system is implemented that monitor the operational parameters of the first delivery robot while in proximity to the sensors, or a combination thereof.

10. The method of claim 1, wherein the one or more maintenance tasks is recharging a battery of the first delivery robot, replacing the battery of the first delivery robot, replacing a part of the first delivery robot, fixing the part of the first delivery robot, cleaning the first delivery robot, applying fluids to the first delivery robot, and adding the fluids to the first delivery robot.

11. A coordination server comprising:

one or more computer processors, one or more computer-readable storage media, and program instructions stored on the one or more computer-readable storage media for execution by at least one of the one or more computer processors capable of performing a method, the method comprising:

receiving performance information associated with a first delivery robot of a robot-based delivery system, the performance information indicative of operational parameters of the first delivery robot;

determining one or more maintenance tasks to be performed on the first delivery robot prior to a delivery task in collecting a package and delivering the package based on the performance information;

determining a time required to perform the one or more maintenance tasks;

determining a location on a delivery arrangement of the robot-based delivery system based on the one or more maintenance tasks and the time, wherein the delivery arrangement including a package conveyor on which the package is placed and moved therealong and a delivery robot conveyor on which the first delivery robot is to be placed and moved therealong; and transmitting an instruction to the first delivery robot to land on the delivery robot conveyor that includes a plurality of delivery robots at the location such that the one or more maintenance tasks being performed is synchronized with the first delivery robot being prepared for the delivery task, wherein the instruction positions the first delivery robot between a second delivery robot from the plurality of delivery robots and a third delivery robot from the plurality of delivery robots;

Landing the first delivery robot autonomously in response to the instruction.

12. The coordination server of claim 11, wherein the first delivery robot is a drone.

13. The coordination server of claim 11, wherein determining the one or more maintenance tasks is based on the performance information relative to an expected performance range to a corresponding one of the operational parameters.

14. The coordination server of claim 11, wherein the package conveyor moves the package in a first direction and, upon landing, the delivery robot conveyor moves the first delivery robot in a second direction, the package moving along a package path on the package conveyor and the first delivery robot moving along a delivery robot path on the delivery robot conveyor, the first delivery robot being positioned over the package after the one or more maintenance tasks are completed for the first delivery robot to collect the package.

15. The coordination server of claim 11, further comprising:

determining whether the second delivery robot is to be moved to accommodate the location on which the first delivery robot is to land;

as a result of the second delivery robot being moved, determining a further location for the second delivery robot; and transmitting a further instruction to the second delivery robot.

16. The coordination server of claim 11, wherein the delivery robot conveyor comprises a plurality of delivery robot tracks on which the first delivery robot is moved therealong, the method further comprising:

determining whether the first delivery robot is to move from a first one of the plurality of delivery robot tracks to a second one of the plurality of delivery robot tracks based on the time.

17. The coordination server of claim 11, wherein the package is one of a plurality of packages on the package conveyor, the method further comprising:

determining the package from among the plurality of packages to be assigned to the first delivery robot, wherein the one or more maintenance tasks are based on delivery information associated with the package.

18. The coordination server of claim 11, wherein the method further comprises:

determining an additional time required to prepare the first delivery robot for the delivery task, the additional time being based on non-maintenance tasks.

19. The coordination server of claim 11, wherein the performance information is generated by one of internal sensors of the first delivery robot monitoring the operational parameters, sensors of a warehouse in which the robot-based delivery system is implemented that monitor the operational parameters of the first delivery robot while in proximity to the sensors, or a combination thereof.

* * * * *